(12) United States Patent
Nishioka et al.

(10) Patent No.: US 11,727,059 B2
(45) Date of Patent: Aug. 15, 2023

(54) RETRIEVAL SENTENCE UTILIZATION DEVICE AND RETRIEVAL SENTENCE UTILIZATION METHOD

(71) Applicant: NEC Corporation, Tokyo (JP)

(72) Inventors: Jun Nishioka, Tokyo (JP); Yoshiaki Sakae, Tokyo (JP); Kazuhiko Isoyama, Tokyo (JP); Etsuko Ichihara, Tokyo (JP); Kosuke Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 341 days.

(21) Appl. No.: 16/980,234

(22) PCT Filed: Mar. 14, 2018

(86) PCT No.: PCT/JP2018/009960
§ 371 (c)(1),
(2) Date: Sep. 11, 2020

(87) PCT Pub. No.: WO2019/176011
PCT Pub. Date: Sep. 19, 2019

(65) Prior Publication Data
US 2021/0342396 A1 Nov. 4, 2021

(51) Int. Cl.
*G06F 16/901* (2019.01)
*G06F 16/31* (2019.01)
(Continued)

(52) U.S. Cl.
CPC ...... *G06F 16/9024* (2019.01); *G06F 3/04842* (2013.01); *G06F 16/288* (2019.01); *G06F 16/322* (2019.01); *G06F 16/3334* (2019.01)

(58) Field of Classification Search
CPC .................................................. G06F 16/9024
See application file for complete search history.

(56) References Cited

U.S. PATENT DOCUMENTS

2006/0101073 A1\* 5/2006 Popa ....................... G06F 16/84
2011/0119245 A1 5/2011 Sargeant et al.
(Continued)

FOREIGN PATENT DOCUMENTS

JP 05-233397 A 9/1993
JP 2010-108152 A 5/2010
(Continued)

OTHER PUBLICATIONS

International Search Report for PCT/JP2018/009960 dated Jun. 5, 2018 (PCT/ISA/210).

*Primary Examiner* — Van H Oberly
(74) *Attorney, Agent, or Firm* — Sughrue Mion, PLLC

(57) ABSTRACT

To enable a user to easily recognize temporal order of elements included in a retrieval sentence, a retrieval sentence utilization device 10 includes: a retrieval sentence division unit 11 for dividing a retrieval sentence into a plurality of retrieval contents each of which includes an event; and a directed graph generation unit 12 for generating, from each of the retrieval contents, a subtree in which the event is an edge and a source of the event and an object of the event are nodes, and integrating a plurality of subtrees generated from the retrieval contents to generate a directed graph, wherein the directed graph generation unit 12 places the plurality of subtrees in the directed graph according to occurrence order of events corresponding to the plurality of subtrees.

14 Claims, 9 Drawing Sheets

(51) Int. Cl.
*G06F 16/33* (2019.01)
*G06F 16/28* (2019.01)
*G06F 3/04842* (2022.01)

(56) References Cited

U.S. PATENT DOCUMENTS

2012/0284255 A1   11/2012   Schechter et al.
2019/0146970 A1*   5/2019   Chamieh ........... G06F 16/24542
                                                                                 707/718

FOREIGN PATENT DOCUMENTS

JP       2016-218805 A    12/2016
JP       2017-130236 A    7/2017

\* cited by examiner

| IDENTIFIER | CONDITIONAL SENTENCE (SUBTREE) |
|---|---|
| T1 | PROC A → FILE B |
| T2 | PROC B → PROC A |
| T3 | PROC A → FILE E |
| T4 | PROC B → IP D |

501

502

FIG. 8
| COMPONENT | EVENT (OBJECT) | PARAMETER |
|---|---|---|
| PROC | start, end(PROC)/read, write(FILE, IP)/exec(FILE) | name, path, pid |
| FILE | | name, path |
| IP | | address, port |
701
FIG. 9
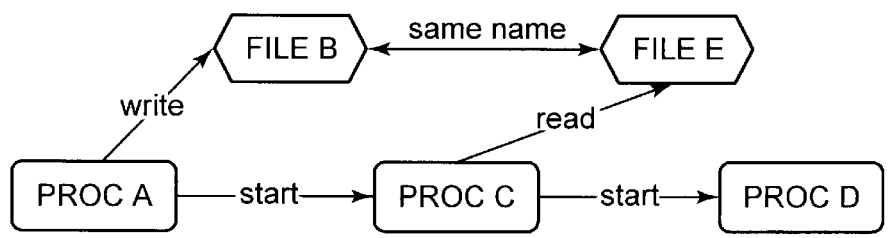
FIG. 10
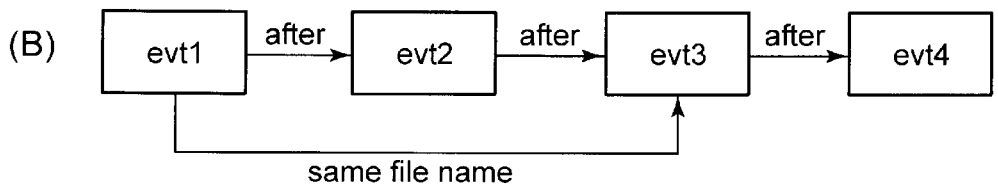

RETRIEVAL SENTENCE UTILIZATION DEVICE AND RETRIEVAL SENTENCE UTILIZATION METHOD

CROSS REFERENCE TO RELATED APPLICATIONS

This application is a National Stage of International Application No. PCT/JP2018/009960 filed Mar. 14, 2018.

TECHNICAL FIELD

The present invention relates to a retrieval sentence utilization device and a retrieval sentence utilization method for facilitating data retrieval.

BACKGROUND ART

When performing retrieval on a database or the like, a retriever (user) makes a retrieval sentence representing retrieval contents using a domain specific language (DSL) such as SQL (Structured Query Language). In the case of SQL, for example, the user makes a retrieval sentence in predetermined syntax such as SQL syntax.

A user who has low syntax proficiency level or is inexperienced in making retrieval sentences has difficulty in making an accurate retrieval sentence in a short time. Such a user is also likely to take a long time to determine whether the retrieval sentence which the user made is correct. Such a user is also likely to take a long time to, when finding an error in the retrieval sentence which the user made, correct the retrieval sentence. Moreover, such a user has difficulty in reusing a retrieval sentence made by another person, because the user may be unable to recognize immediately what is meant by the retrieval sentence.

Patent Literature (PTL) 1 describes a device for visualizing and displaying a query representing retrieval contents so that a user can easily recognize the contents of the query and the validity of the query.

The device described in PTL 1 displays, on a display unit, a graph in which conditional expressions consist of a query are nodes and a retrieval operation expression is an edge.

CITATION LIST

Patent Literature

PTL 1: Japanese Patent Application Laid-Open No. 2016-218805

SUMMARY OF INVENTION

Technical Problem

The device described in PTL 1 hierarchically displays the plurality of conditional expressions that are included in the retrieval expression and form a nesting structure. Examples of the retrieval operation expressions associating the plurality of conditional expressions in the retrieval expression with each other include an expression representing logical OR and an expression representing logical AND. That is, the device described in PTL 1 makes easily visible the relationship between the plurality of conditional expressions forming the nesting structure, by displaying the graph including nodes and edges on the display unit.

There is, however, no causal relationship between the plurality of conditional expressions. That is, the plurality of conditional expressions in the retrieval expression does not involve a concept of temporal order.

The present invention has an object of providing a retrieval sentence utilization device and a retrieval sentence utilization method that enables a user to easily recognize not only the meaning of a retrieval sentence but also the temporal order of elements included in the retrieval sentence.

Solution to Problem

A retrieval sentence utilization device according to the present invention includes: retrieval sentence division means for dividing a retrieval sentence into a plurality of retrieval contents each of which includes an event; and directed graph generation means for generating, from respective retrieval contents, subtrees each of which includes an edge as the event and includes nodes as a source of the event and an object of the event, and integrating the subtrees into a directed graph, wherein the directed graph generation means places the subtrees in the directed graph according to occurrence order of events corresponding to the subtrees.

A retrieval sentence utilization method according to the present invention includes: dividing a retrieval sentence into a plurality of retrieval contents each of which includes an event; and generating, from each of the retrieval contents, a subtree in which the event is an edge and a source of the event and an object of the event are nodes, and integrating a plurality of subtrees generated from the retrieval contents to generate a directed graph, wherein, when generating the directed graph, the plurality of subtrees are placed in the directed graph according to occurrence order of events corresponding to the plurality of subtrees.

A retrieval sentence utilization program according to the present invention causes a computer to execute: a process of dividing a retrieval sentence into a plurality of retrieval contents each of which includes an event; and a process of generating, from each of the retrieval contents, a subtree in which the event is an edge and a source of the event and an object of the event are nodes, and integrating a plurality of subtrees generated from the retrieval contents to generate a directed graph, wherein, when generating the directed graph, the computer is caused to execute a process of placing the plurality of subtrees in the directed graph according to occurrence order of events corresponding to the plurality of subtrees.

Advantageous Effects of Invention

According to the present invention, it is possible to enable a user to easily recognize not only the meaning of a retrieval sentence but also the temporal order of elements included in the retrieval sentence.

BRIEF DESCRIPTION OF DRAWINGS

FIG. 8 is an explanatory diagram depicting an example of parameter information.

FIG. 9 is an explanatory diagram depicting an example of a directed graph.

FIG. 10 is an explanatory diagram for describing a method of generating a retrieval sentence from a directed graph.

DESCRIPTION OF EMBODIMENT

Exemplary embodiments of the present invention will be described below, with reference to the drawings.

Exemplary Embodiment 1

Figure 1:
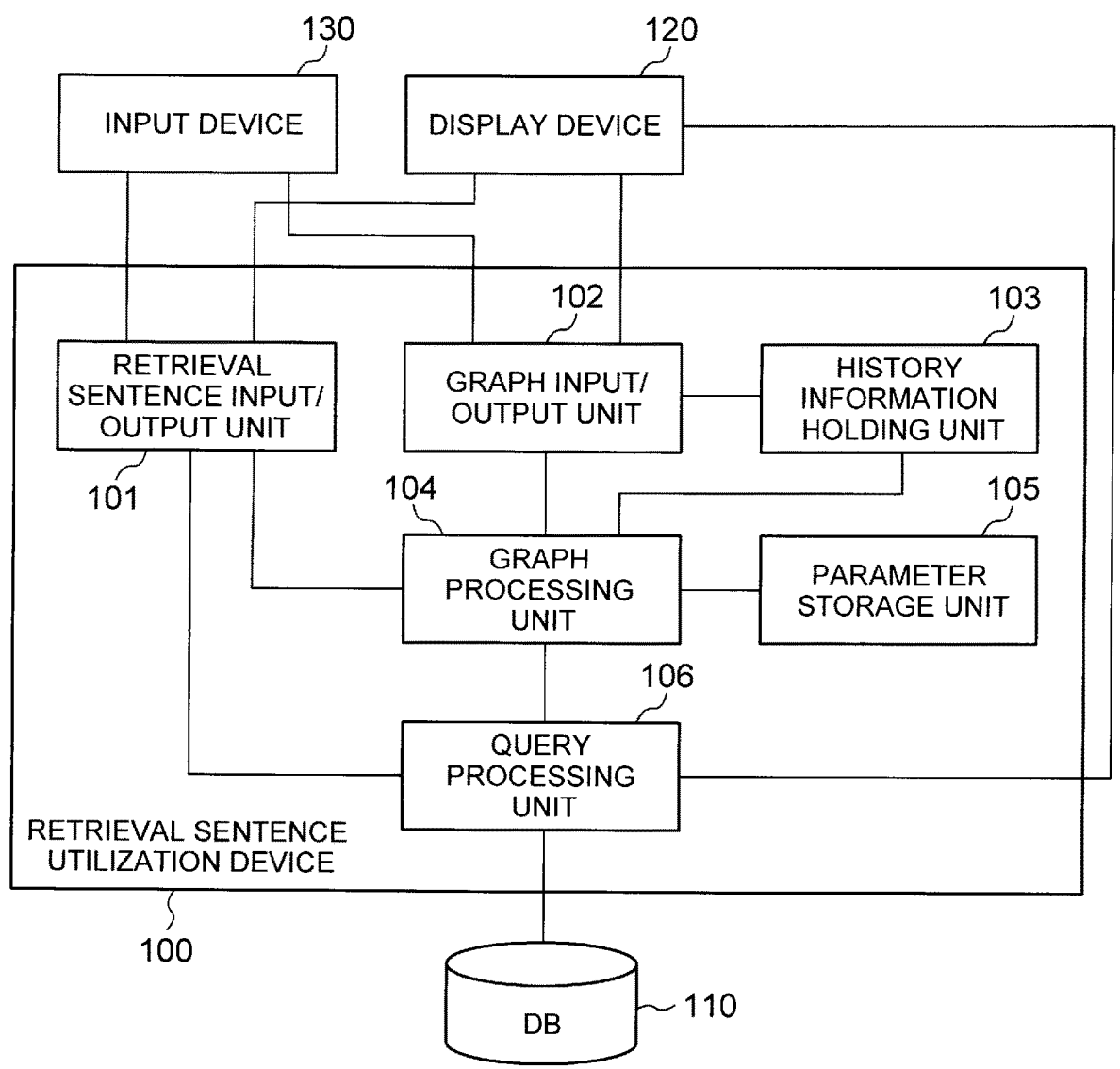
FIG. 1 is a block diagram depicting an example of a structure of Exemplary Embodiment 1 of a retrieval sentence utilization device.

FIG. 1 is a block diagram depicting an example of a structure of Exemplary Embodiment 1 of a retrieval sentence utilization device. In the example depicted in FIG. 1, a retrieval sentence utilization device 100 includes a retrieval sentence input/output unit 101, a graph input/output unit 102, a history information holding unit 103, a graph processing unit 104, a parameter storage 105, and a query processing unit 106.

In the example depicted in FIG. 1, a query for retrieval is issued from the retrieval sentence utilization device 100 to a database (DB) 110.

An input device 130 is used by a user to input a retrieval sentence and the like. A display device 120 is used to display a graphed retrieval sentence and the like.

The retrieval sentence input/output unit 101 receives a retrieval sentence input by the user using the input device 130. The graph input/output unit 102 performs processes such as displaying a directed graph on the display device 120 and inputting a designated directed graph. The history information holding unit 103 holds each retrieval sentence used in the past.

The graph processing unit 104 turns the input retrieval sentence into a directed graph. The graph processing unit 104 also converts the retrieval sentence expressed in the directed graph, into a DSL supported by the DB 110. The parameter storage unit 105 stores parameter information including an event type, an event content, corresponding parameter of the event, etc. which are interested in the retrieval sentence, beforehand. The parameter information may include information about the below-described source of the event (e.g. the type and content of the source and its relation with other sources).

In this exemplary embodiment and the subsequent exemplary embodiments, events include at least file access operation (e.g. write), start/generation or end (e.g. start or exit) of a process, and communication operation (e.g. open).

The query processing unit 106 issues a query to the DB 110.

Figure 2:
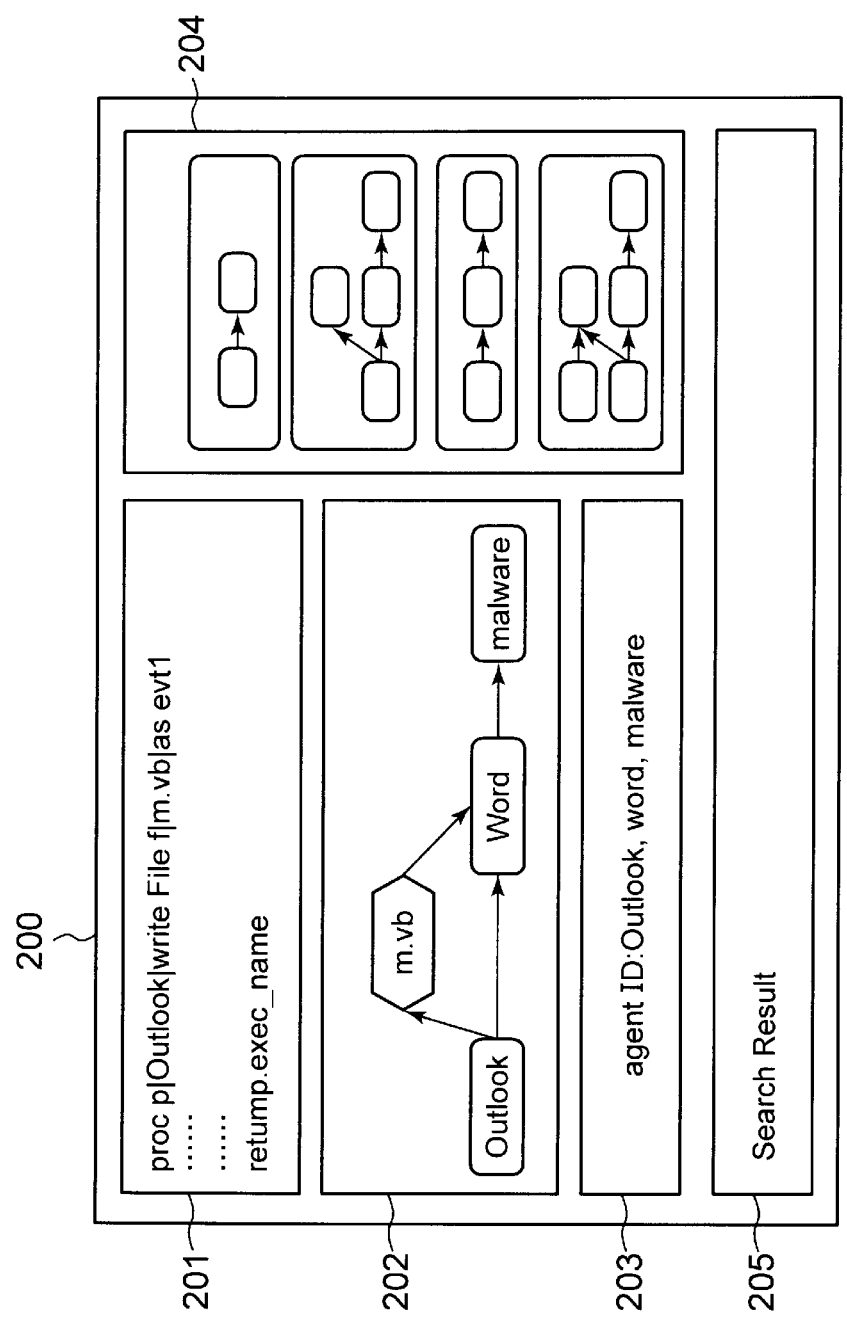
FIG. 2 is an explanatory diagram depicting an example of a screen displayed on a display device.

FIG. 2 is an explanatory diagram depicting an example of a screen displayed on the display device 120. In the example depicted in FIG. 2, a screen 200 includes regions of a retrieval sentence input part 201, a graph display part 202, a display parameter selection part 203, a retrieval history display part 204, and a retrieval result display part 205.

The retrieval sentence input part 201 is used by the user to input a retrieval sentence. The graph display part 202 is used to display a generated directed graph. The display parameter selection part 203 is used by the user to select a parameter displayed together with a retrieval result. The retrieval history display part 204 is used to display each retrieval sentence used in the past in the form of a directed graph. The retrieval result display part 205 is used to display a retrieval result.

Figure 3:
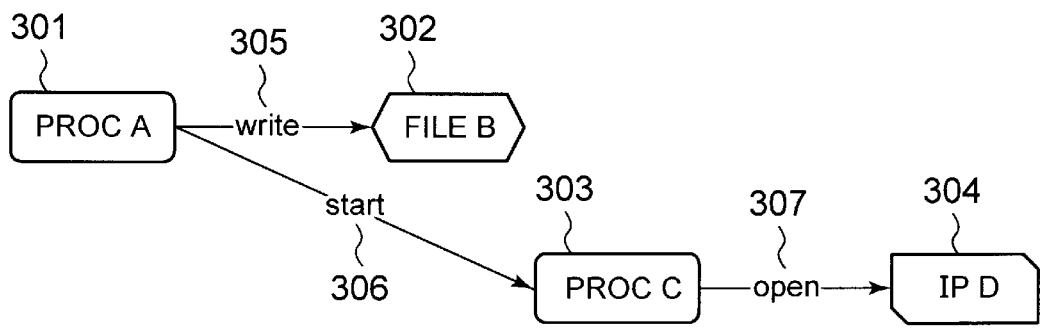
FIG. 3 is an explanatory diagram depicting an example of a graphed retrieval sentence.

FIG. 3 is an explanatory diagram depicting an example of a graphed retrieval sentence. A retrieval sentence has been turned into a directed graph.

FIG. 3 depicts an example of graphing a retrieval sentence representing a series of operations (functions) "process A writes file B, and generates process C, and process C starts communication with communication destination D". In the example depicted in FIG. 3, the series of operations include an operation "process A writes file B", an operation "process A generates process C", and an operation "process C starts communication with communication destination D".

That is, the term "operation" corresponds to a retrieval content constituting the retrieval sentence. In this description, one or more operations included in a retrieval sentence are referred to as "retrieval contents" or "occurrence events". As an example, each retrieval content is composed of [source of event, event such as write or start, and object of event].

In the directed graph depicted in FIG. 3, a process 301 (process A) is a source of an event 305 (file operation event). A file 302 (file B) is an object of the event 305. A process 303 (process C) is an object of an event 306 (process execution event). A communication destination 304 (communication destination D) is an object of an event 307 (communication operation event). The process 303 (process C) is also a source of the event 307 (communication operation event).

Hereafter, an event source or an event object (process A, file B, process C, and communication destination D in the example depicted in FIG. 3) is also referred to as "component".

In this exemplary embodiment and the subsequent exemplary embodiments, "components" include at least files, processes, and communication destinations.

In the directed graph, each component is represented by a node, and each event is represented by an edge.

The directed graph depicted in FIG. 3 is displayed on the display device 120. In the displayed directed graph, a node corresponding to an object of an event (or a source and an object of an event) of an occurrence event that occurs later is set at such a position that allows the user to intuitively recognize that the node is temporally subsequent to a node corresponding to an object of an event (or a source and an object of an event) of an occurrence event that occurs earlier. In the example depicted in FIG. 3, such a position is the right side. Here, the right side is an example of the setting position of the node of the occurrence event that occurs later. Other positions that allow the user to intuitively specify that the node corresponds to the occurrence event that occurs later may be used instead of the right side, depending on the user characteristics and the like.

Operation of the retrieval sentence utilization device 100 will be described below, with reference to a flowchart in FIG. 4 and explanatory diagrams in FIGS. 5 and 6. In the following description, a retrieval sentence including a series of retrieval contents "process A writes file B, and generates process C, and process C starts communication with communication destination D" is used as an example.

Figure 4:
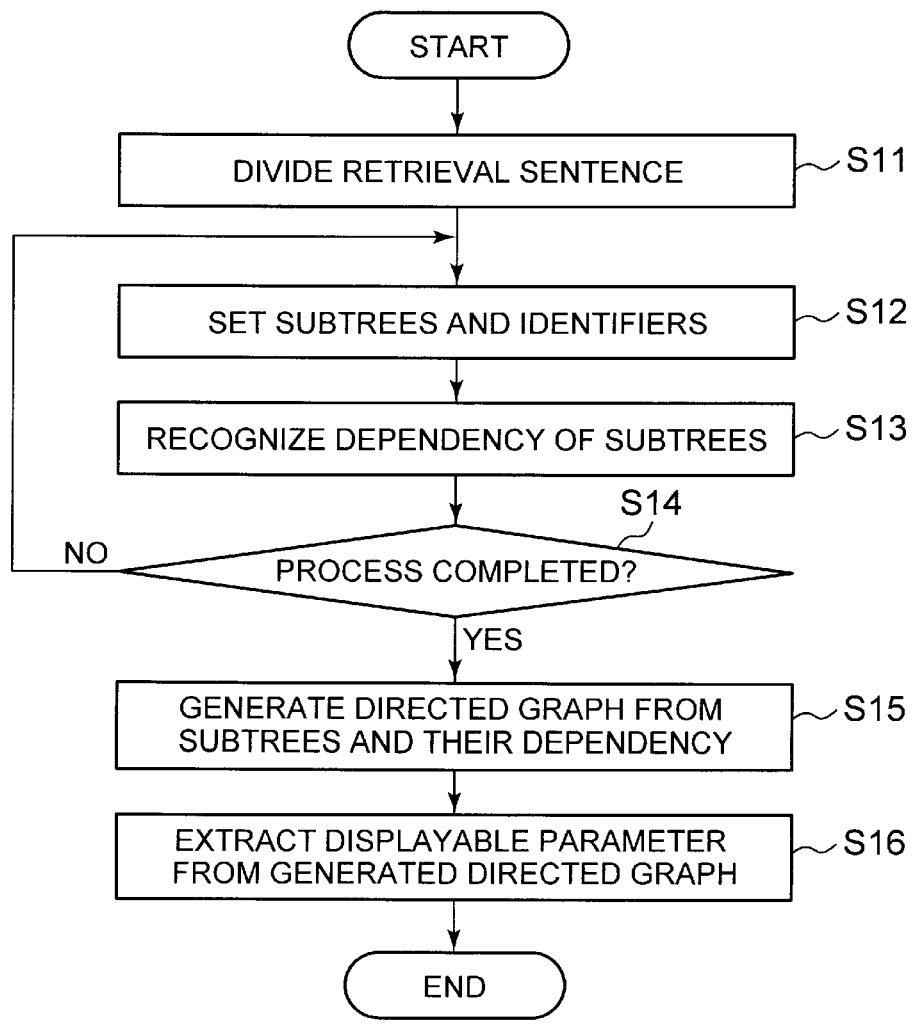
FIG. 4 is a flowchart depicting operation of the retrieval sentence utilization device.

FIG. 4 depicts an example of the operation of the retrieval sentence utilization device 100. FIG. 5 depicts an example of a table 501 in which occurrence events (retrieval contents) are recorded. FIG. 6 depicts an example of a graph 502 generated based on the dependency among the occurrence events. The table 501 and the graph 502 are stored in a storage device (not depicted in FIG. 1) in the retrieval sentence utilization device 100.

When a retrieval sentence is input to the retrieval sentence input/output unit 101, the graph processing unit 104 performs syntax analysis on the retrieval sentence, and segments the retrieval sentence into one or more subtrees (step S11). The subtrees correspond to occurrence events (see FIG. 5).

Figures 5, 6:
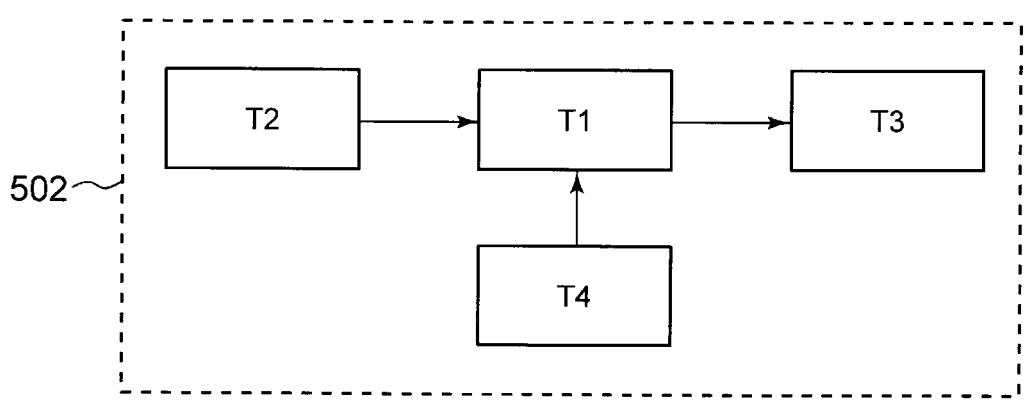
FIG. 5 is an explanatory diagram depicting an example of a table in which occurrence events (retrieval contents) are recorded.
FIG. 6 is an explanatory diagram depicting an example of a graph generated based on the dependency among the occurrence events.

The graph processing unit 104 sets the subtrees and identifiers corresponding to the subtrees in the table 501, as depicted in FIG. 5 (step S12). The graph processing unit 104 also generate a graph indicating the subtrees so that their dependency can be specified, as depicted in FIG. 6 (step S13). When executing the processes in steps S12 and S13, the graph processing unit 104 uses the parameter information stored in the parameter storage unit 105.

After executing the processes in steps S12 and S13 for all subtrees (step S14), the graph processing unit 104 generates a directed graph (step S15). Specifically, the graph processing unit 104 places the subtrees depicted in FIG. 5 according to the dependency depicted in FIG. 6. The graph processing unit 104 displays the generated directed graph on the display device 120 via the graph input/output unit 102. The graph input/output unit 102 displays the directed graph in the graph display part 202 in the screen 200 of the display device 120 (see FIG. 2).

When generating the directed graph, the graph processing unit 104 may use predetermined information to determine the position of each subtree in the directed graph. The graph processing unit 104 may use, as the predetermined information, information described in the retrieval sentence. For example, in the case where the temporal relationship among the occurrence events is explicitly described in the retrieval sentence, the graph processing unit 104 places the subtrees in the directed graph according to the temporal order (occurrence order).

Further, the graph processing unit 104 extracts, from the directed graph, each component relating to a parameter which can be displayed in reference to the result of retrieval using the retrieval sentence (step S16). For example, the graph processing unit 104 reads a parameter corresponding to each component from the parameter storage unit 105. For example, in the case where a component in the directed graph matches any of the components for which parameters are set, the graph processing unit 104 determines that its parameter is displayable.

The displayable parameter is used when displaying the retrieval result on the display device 120 after the execution of the retrieval process by the query processing unit 106. That is, the query processing unit 106 displays the retrieval result including the parameter on the display device 120. The query processing unit 106 may also display a list of values (e.g. operation time) corresponding to the parameter, on the display device 120. Displaying the list when the user refines the retrieval sentence (e.g. deletes any occurrence event that is considered not important from the retrieval sentence) is expected to improve the efficiency of the refinement.

The graph processing unit 104 may, when determining the displayable parameter, present candidates for the parameter to the user and request the user to select the parameter displayed. In such a case, the graph processing unit 104 displays the parameters read from the parameter storage unit 105 on the display device 120 via the graph input/output unit 102, as candidates for the displayable parameter. The graph input/output unit 102 displays the candidates for the displayable parameter in the display parameter selection part 203 in the screen 200 of the display device 120 (see FIG. 2). FIG. 2 depicts an example in which the names of components (Outlook®, word, malware) are displayed.

When the user selects a desired parameter from the parameter candidates, the graph processing unit 104 stores the selected parameter temporarily, or stores the parameter in the query processing unit 106. The user selects the desired parameter via the input device 130.

The graph processing unit 104 may summarize the parameters read from the parameter storage unit 105, when displaying the candidates for the parameter on the display device 120. For example, in the case where one component is placed in a plurality of parts in the directed graph, the graph processing unit 104 summarizes the parameters.

In the case where the user executes retrieval using the retrieval sentence represented by the generated directed graph, the query processing unit 106 issues a query based on the retrieval sentence to the DB 110. After this, the graph processing unit 104 records the directed graph corresponding to the used retrieval sentence in the history information holding unit 103.

The graph processing unit 104 may calculate the degree of similarity between the directed graph recorded in the history information holding unit 103 and each directed graph already held in the history information holding unit 103. For example, the graph processing unit 104 uses the degree of coincidence of nodes and the degree of coincidence of edges between the two directed graphs, as the degree of similarity.

The graph processing unit 104 reads all or a predetermined number of directed graphs held in the history information holding unit 103. The graph processing unit 104 displays the directed graphs on the display device 120 via the graph input/output unit 102. The graph input/output unit 102 displays the directed graphs in the retrieval history display part 204 in the screen 200 of the display device 120 (see FIG. 2). The graph processing unit 104 displays the directed graphs in descending order of the degree of similarity (e.g. in descending order of the average value of the degrees of similarity to one or more other directed graphs). The graph processing unit 104 may, for example, display the directed graphs so that directed graphs having a high degree of similarity are close to each other in the retrieval history display part 204.

In the case where the user selects one or more directed graphs displayed in the retrieval history display part 204, the retrieval sentence utilization device 100 reconstructs a retrieval sentence from the selected directed graph. A specific method for reconstructing a retrieval sentence will be described in Exemplary Embodiment 2.

As described above, according to this exemplary embodiment, the retrieval sentence utilization device 100 presents a retrieval sentence to the user as a directed graph made up of nodes and edges, so that the user can easily recognize the meaning of the retrieval sentence. Moreover, by placing subtrees in temporal order in the directed graph, the user can easily recognize the temporal order of occurrence events in the retrieval sentence, i.e. the temporal occurrence order of events. Thus, the user can easily determine whether a retrieval sentence intended by the user is formed.

Exemplary Embodiment 2

When the retrieval sentence utilization device 100 reconstructs a retrieval sentence from a directed graph, the graph processing unit 104 segments the directed graph into subtrees corresponding to the retrieval contents constituting the retrieval sentence. The graph processing unit 104 records the subtrees in a table same as the table 501 depicted in FIG. 5. The graph processing unit 104 also recognizes the dependency (e.g. the occurrence order of events) among the retrieval contents (occurrence events), based on the placement positions of the subtrees in the directed graph. The graph processing unit 104 then reconstructs the retrieval sentence by describing the retrieval contents with reference to the dependency.

According to this exemplary embodiment, the retrieval sentence utilization device 100 segments a directed graph into a plurality of subtrees, determines the occurrence order of events in the plurality of subtrees from the placement positions of the plurality of subtrees in the directed graph, and reconstructs retrieval contents from the plurality of subtrees with reference to the occurrence order of events. Therefore, the user can easily use retrieval sentences generated in the past by the user or by others.

Exemplary Embodiment 3

The retrieval sentence utilization device 100 may unify a plurality of directed graphs into one directed graph.

For example, suppose the user designates a plurality of directed graphs displayed in the retrieval history display part 204. In such a case, the graph input/output unit 102 acquires the designated directed graphs from the history information holding unit 103. The graph input/output unit 102 outputs the acquired directed graphs to the graph processing unit 104.

The graph processing unit 104 segments each of the plurality of directed graphs into occurrence events. Each occurrence event (retrieval content) includes a source of an event and an object of the event, as components. The source of the event and the object of the event are expressed as nodes in the directed graph.

The graph processing unit 104 selects each combination of retrieval contents that match in node, from all retrieval contents. For every combination, the graph processing unit 104 generates a directed graph based on the combination.

The graph processing unit 104 deletes any directed graph in which a loop occurs, from the generated directed graphs. The graph processing unit 104 also deletes any directed graph that has a contradiction in the order of occurrence events. The graph processing unit 104 displays a directed graph group not including the deleted directed graphs, on the display device 120. The directed graph group may include only one directed graph.

The user can select a directed graph from the displayed directed graph group via the input device 130. The retrieval sentence utilization device 100 sets the directed graph selected by the user, as a unified directed graph.

Although this exemplary embodiment describes an example in which directed graphs designated in the retrieval history display part 204 are subjected to unification, directed graphs subjected to unification are not limited to such. For example, a plurality of directed graphs input by the user via the input device 130 may be unified.

In Exemplary Embodiments 1 to 3, the blocks (units) in the retrieval sentence utilization device 100 may be included in one device or distributed among a plurality of devices.

EXAMPLES

Specific examples of Exemplary Embodiments 1 to 3 will be described below.

Example 1

Figure 7:
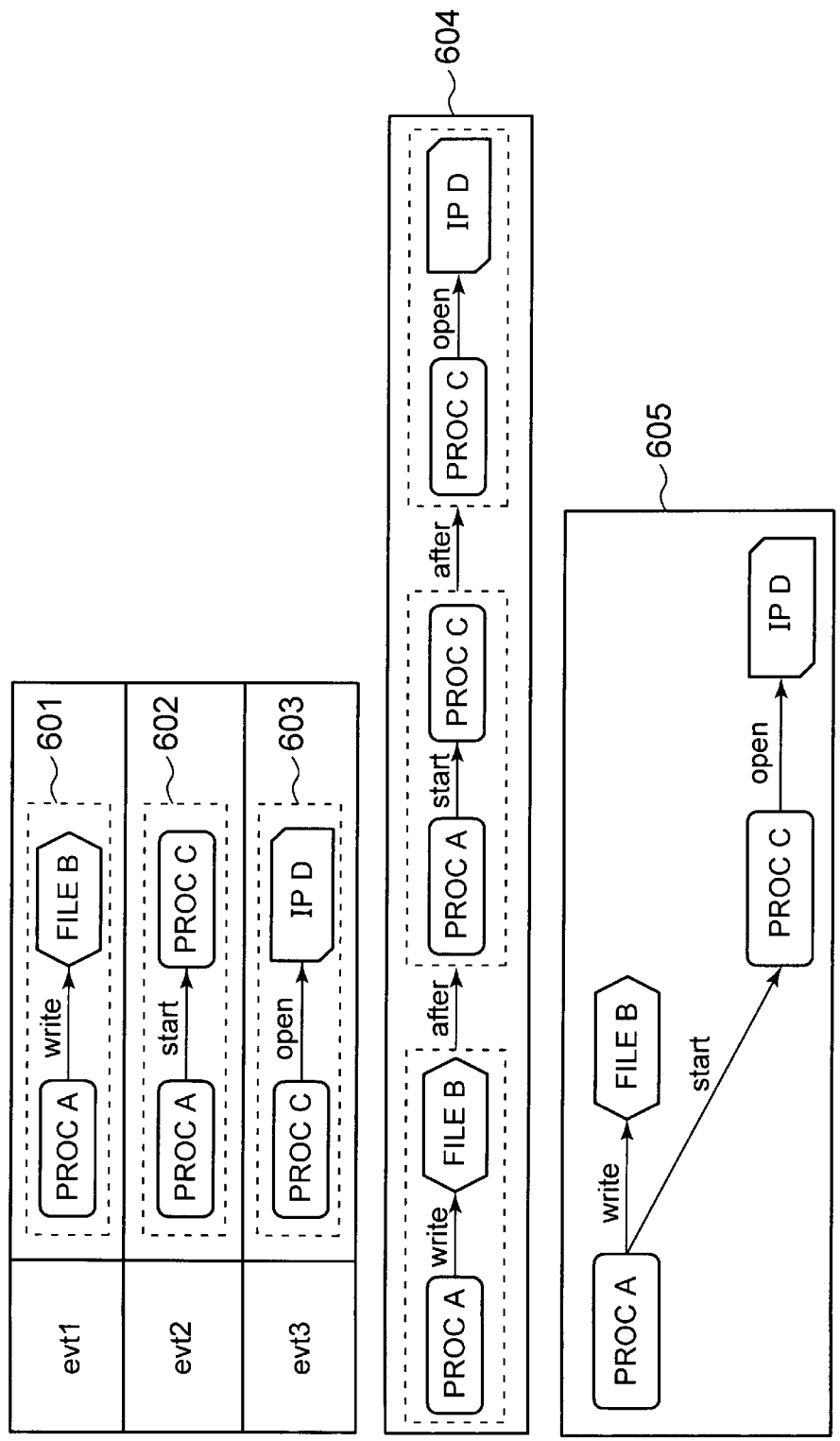
FIG. 7 is an explanatory diagram for describing a method of generating a directed graph.

Example 1 which is a specific example of Exemplary Embodiment 1 will be described below, with reference to FIGS. 7 and 8. FIG. 7 is an explanatory diagram for describing a method of generating a directed graph. FIG. 8 is an explanatory diagram depicting an example of parameter information stored in the parameter storage unit 105.

In the following description, the case where a retrieval sentence including a series of retrieval contents "process A writes file B, and generates process C, and process C starts communication with communication destination D" is input is used as an example. Specifically, the retrieval sentence is input as follows.

proc A write file B as evt1
    (evt1: process A writes file B)
    proc A start proc C as evt2
    (evt2: process A generates process C)
    proc C open ip D as evt3
    (evt3: process C starts communication with communication destination D)
    with evt2 after evt1, evt3 after evt2
    (evt2 is after evt1, evt3 is after evt2).

The graph processing unit 104 segments the retrieval sentence into one or more subtrees. In this example, three subtrees 601, 602, and 603 are generated, as depicted in FIG. 7. The identifiers of the subtrees are evt1, evt2, and evt3.

The graph processing unit 104 places the subtrees 601, 602, and 603 according to the order of occurrence events (retrieval contents) described in the retrieval sentence, to generate a graph. In this example, a graph 604 in which the subtrees 601, 602, and 603 are arranged in order from the left is generated, as depicted in FIG. 7.

The graph processing unit 104 integrates a plurality of subtrees having the same node in the graph 604. In this example, proc A in evt1 and proc A in evt2 are the same, and proc C in evt2 and proc C in evt3 are the same. The graph processing unit 104 accordingly integrates the subtrees 601 and 602 without changing the placement order of the subtrees, as depicted in FIG. 7. A directed graph 605 is thus generated.

The expression "without changing the placement order of the subtrees" means that the node corresponding to the subtree 603 is placed to the right of the nodes corresponding to the subtrees 601 and 602 and the node (PROC C in the example depicted in FIG. 7) corresponding to the subtree 602 is placed to the right of the node (FILE B in the example depicted in FIG. 7) corresponding to the subtree 601.

The graph processing unit 104 also references to the parameter information stored in the parameter storage unit 105. Based on the parameter information, for example, the graph processing unit 104 displays the following parameters in the display parameter selection part 203 in the screen 200 of the display device 120 via the graph input/output unit 102.

machine name in which proc A and proc C are running
name and pid (process identification (ID)) of proc A
name and pid of proc B
name and pid of proc C
name and path of file B
address and port of ip D
occurrence time of evt1
occurrence time of evt2
occurrence time of evt3.

Example 2

Example 2 which is a specific example of Exemplary Embodiment 2 will be described below, with reference to FIGS. 9 and 10. FIG. 9 is an explanatory diagram depicting an example of a directed graph. FIG. 10 is an explanatory diagram for describing a method of generating a retrieval sentence from a directed graph.

In the following description, the case where the graph processing unit 104 generates (reconstructs) a retrieval sentence from the directed graph depicted in FIG. 9 is used as an example.

The graph processing unit 104 segments the directed graph into a plurality of subtrees. That is, the graph processing unit 104 obtains subtrees each of which is made up of one edge and two nodes on both sides of the edge. Consequently, four subtrees (subtrees with identifiers evt1, evt2, evt3, and evt4) depicted in (A) in FIG. 10 are obtained.

The graph processing unit 104 then generates a graph according to the dependency among the four subtrees (see (B) in FIG. 10). The dependency includes the occurrence order of occurrence events. In the directed graph, a node (a node corresponding to a source of an event or a node corresponding to an object of the event) in an occurrence event that occurs later is placed to the right of a node in an occurrence event that occurs earlier. Hence, the graph processing unit 104 can easily determine the dependency based on the positional relationship in the directed graph.

The graph processing unit 104 generates the following retrieval sentence, based on evt1, evt2, evt3, and evt4 depicted in (A) in FIG. 10. The graph processing unit 104 adds description about the dependency (occurrence order) to the retrieval sentence, based on the graph depicted in (B) in FIG. 10.

proc A write file B as evt1
(evt1: process A writes file B)
proc A start proc C as evt2
(evt2: process A generates process C)
proc C read file E as evt3
(evt3: process C reads file E)
proc C start proc D as evt4
(evt4: process C generates process D)
with evt2 after evt1, evt3 after evt2, evt4 after evt3, B.name=E.name.

The graph processing unit 104 also adds parameters to the retrieval sentence as follows.

machine name in which proc A, proc C, and proc D are running
name and pid of proc A
name and pid of proc C
name and pid of proc D
name of file B and file E
path of file B
path of file E
occurrence time of evt1
occurrence time of evt2
occurrence time of evt3
occurrence time of evt4.

The description relating to the dependency (occurrence order) substantially corresponds to the following retrieval sentence.

"Process A writes file B and then generates process C, and process C reads file E and then generates process D".

Example 3

Figure 11:
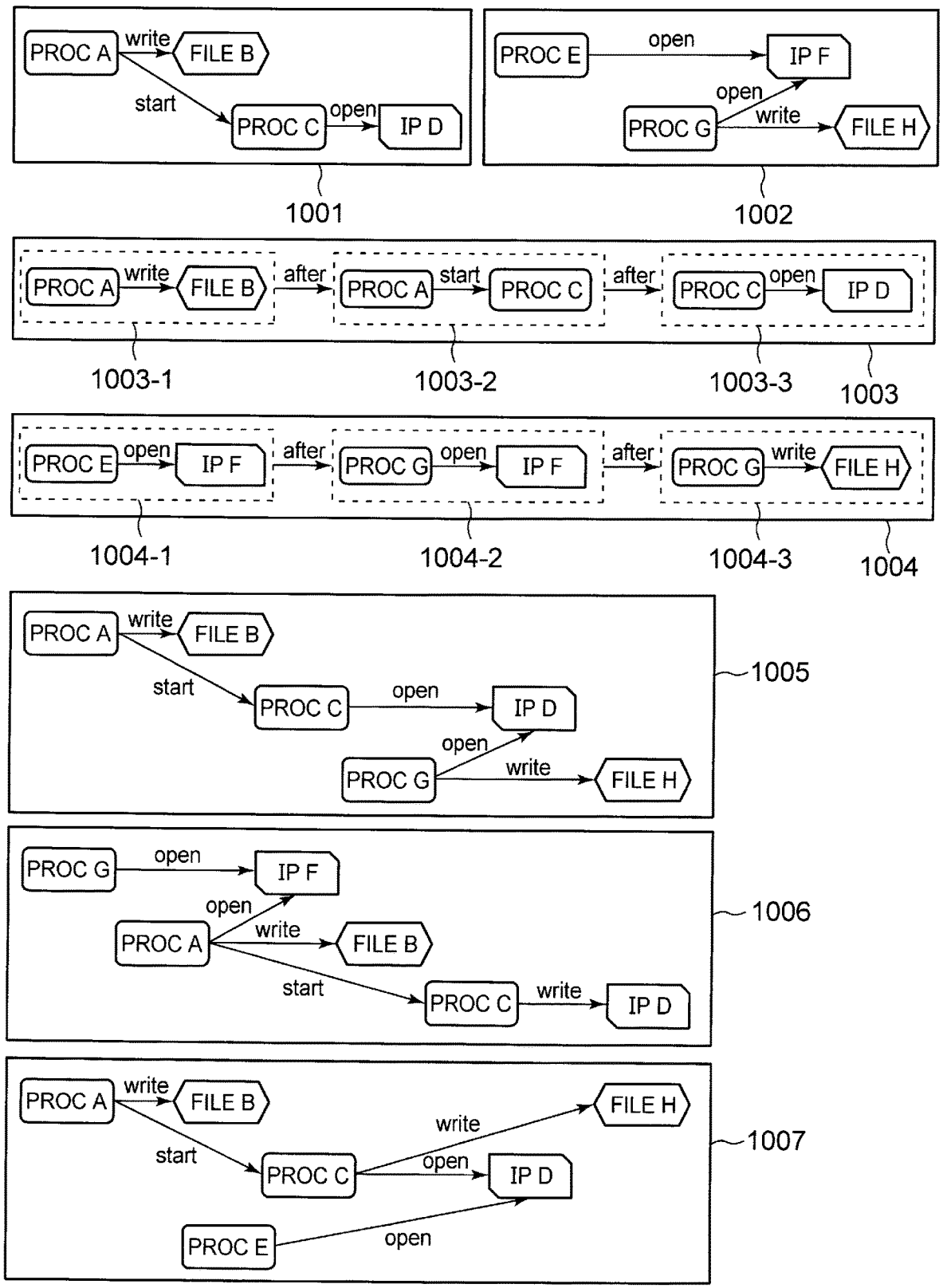
FIG. 11 is an explanatory diagram for describing a method of integrating a plurality of retrieval sentences.

Example 3 which is a specific example of Exemplary Embodiment 3 will be described below, with reference to FIG. 11. FIG. 11 is an explanatory diagram for describing a method of integrating a plurality of retrieval sentences.

Suppose there are directed graphs 1001 and 1002 corresponding to two retrieval sentences depicted in FIG. 11. In the case of unifying the directed graphs 1001 and 1002, the graph processing unit 104 segments each of the directed graphs 1001 and 1002 into graphs corresponding to occurrence events. In the example depicted in FIG. 11, the directed graph 1001 is segmented into graphs 1003-1, 1003-2, and 1003-3. The graphs 1003-1, 1003-2, and 1003-3 are referred to as a graph group 1003. The directed graph 1002 is segmented into graphs 1004-1, 1004-2, and 1004-3. The graphs 1004-1, 1004-2, and 1004-3 are referred to as a graph group 1004.

Next, the graph processing unit 104 compares the graphs 1003-1, 1003-2, and 1003-3 in the graph group 1003 and the graphs 1004-1, 1004-2, and 1004-3 in the graph group 1004. Specifically, the graph processing unit 104 compares the event of each occurrence event (i.e. graph) in the graph group 1003 and the event of each occurrence event in the graph group 1004.

In the example depicted in FIG. 11, the event of the graph 1003-1 and the event of the graph 1004-3 are the same, and the event of the graph 1003-3 and the events of the graphs 1004-1 and 1004-2 are the same. There are other graphs that have a common event. Combining graphs that have a common event yields the following combinations. That is, combinations of graphs that can be candidates for a newly generated directed graph are as follows.

combination A: [(1003-1, 1004-3)]
combination B: [(1003-3, 1004-1)]
combination C: [(1003-3, 1004-2)]
combination D: [(1003-1, 1004-3), (1003-3, 1004-1)]
combination E: [(1003-1, 1004-3), (1003-3, 1004-2)].

In the case where each combination is unified to form a graph, a loop occurs in the graph for each of combination D and combination E. The graph processing unit 104 does not generate a new directed graph based on such combinations. That is, the graph processing unit 104 excludes the directed graphs based on such combinations from candidates for a newly generated directed graph. The graph processing unit 104 unifies each combination in which no loop occurs, to generate a new directed graph, A directed graph 1005 in FIG. 11 is generated based on combination A. A directed graph 1006 in FIG. 11 is generated based on combination B. A directed graph 1007 in FIG. 11 is generated based on combination C. In the example depicted in FIG. 11, when generating the directed graphs based on combinations A, B, and C, other graphs in the graph group 1003 are also used.

In the case where a plurality of directed graphs are generated, the graph processing unit 104 may request the user to select a directed graph. In such a case, the graph processing unit 104 displays the plurality of directed graphs on the display device 120 via the graph input/output unit 102. In the case where the user selects a directed graph via the input device 130, the graph processing unit 104 sets the directed graph selected by the user, as a designated directed graph.

When generating the directed graphs 1005, 1006, and 1007 from the graph groups 1003 and 1004, the graph processing unit 104 regards components having a common event (such as "open") in the subtrees as being the same.

For example, for the directed graph 1007, the graph processing unit 104 regards the components in the subtree 1003-3 (PROC C→IP D) and the components in the subtree 1004-2 (PROC G→IP F) as being the same. In detail, the graph processing unit 104 presumes that PROC C=PROC G and IP D=IP F. Likewise, the graph processing unit 104 presumes that (PROC E→IP F) in the subtree 1004-1 is (PROC E→IP D). The directed graph 1007 is thus generated.

In information technology (IT) systems, security systems for preventing attacks and intrusions from outside and detecting intrusions and attacks are introduced. In a security system, rule-based or machine-learning intrusion detection and attack detection are conducted. There is a need for a function of, after detecting an intrusion or an attack, retrieving history of processes, file operation, communication, and the like in order to recognize what kind of behavior or state was a cause of the intrusion or the seriousness of the attack.

By using the retrieval sentence utilization device 100 according to any of Exemplary Embodiments 1 to 3, the user can generate a retrieval sentence for easily retrieving such history. The user can easily retrieve the history, with there being no need for high skill for generating retrieval sentences. Thus, the user can specify, for example, causes of attacks or intrusions from outside more easily and quickly.

Figure 12:
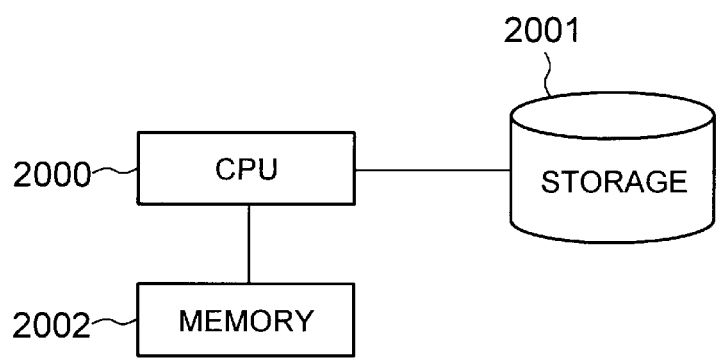
FIG. 12 is a block diagram depicting an example of a computer including a CPU.

FIG. 12 is a block diagram depicting an example of a computer including a CPU. The computer is implemented in the retrieval sentence utilization device 100. A CPU 2000 realizes the functions in each of the foregoing exemplary embodiments, by executing processes according to a program stored in a storage 2001. In detail, the CPU 2000 realizes the functions of the graph processing unit 104 and the query processing unit 106 and functions relating to computation in other blocks in the retrieval sentence utilization device 100 depicted in FIG. 1.

The storage 2001 is, for example, a non-transitory computer readable medium. The non-transitory computer readable medium includes any of various types of tangible storage media. Specific examples of the non-transitory computer readable medium include magnetic storage media (e.g. flexible disk, magnetic tape, hard disk drive), magneto-optical storage media (e.g. magneto-optical disk), CD-ROM (Compact Disc-Read Only Memory), CD-R (Compact Disc-Recordable), CD-R/W (Compact Disc-Rewritable), and semiconductor memory (e.g. mask ROM, PROM (Programmable ROM), EPROM (Erasable PROM), flash ROM). The storage 2001 realizes the history information holding unit 103 and the parameter storage unit 105.

The program may be stored in any of various types of transitory computer readable media. The program is supplied to a transitory computer readable medium, for example, via a wire communication channel or a wireless communication channel, i.e. via an electric signal, an optical signal, or an electromagnetic wave.

A memory 2002 is implemented by RAM (Random Access Memory) as an example, and is a storage means for temporarily storing data when the CPU 2000 executes processes. The program held in the storage 2001 or the transitory computer readable medium may be transferred to the memory 2002, with the CPU 2000 executing processes according to the program in the memory 2002.

Figure 13:
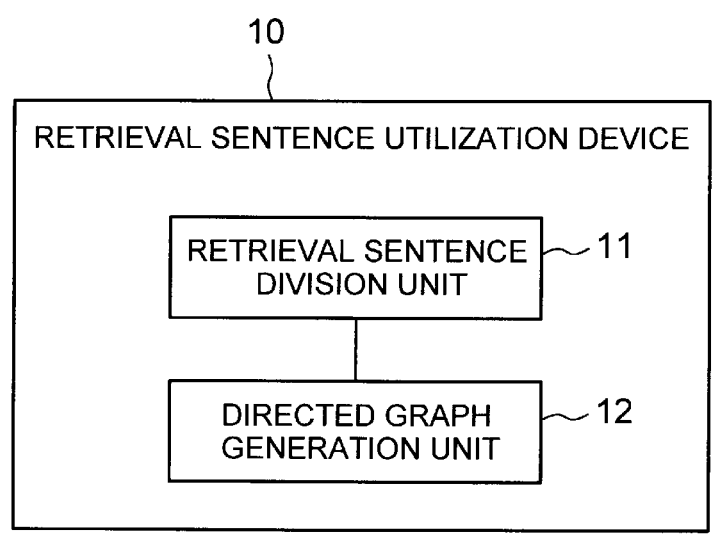
FIG. 13 is a block diagram depicting main parts of a retrieval sentence utilization device.

FIG. 13 is a block diagram depicting main parts of a retrieval sentence utilization device 10. As depicted in FIG. 13, the retrieval sentence utilization device 10 includes: a retrieval sentence division unit 11 (realized by the graph processing unit 104 in the exemplary embodiments) for dividing a retrieval sentence into a plurality of retrieval contents each of which includes an event; and a directed graph generation unit 12 (realized by the graph processing unit 104 in the exemplary embodiments) for generating, from each of the retrieval contents, a subtree in which the event is an edge and a source of the event and an object of the event are nodes, and integrating subtrees generated from the retrieval contents to generate a directed graph. The directed graph generation unit 12 places the subtrees in the directed graph according to occurrence order of events corresponding to the plurality of subtrees.

Figure 14:
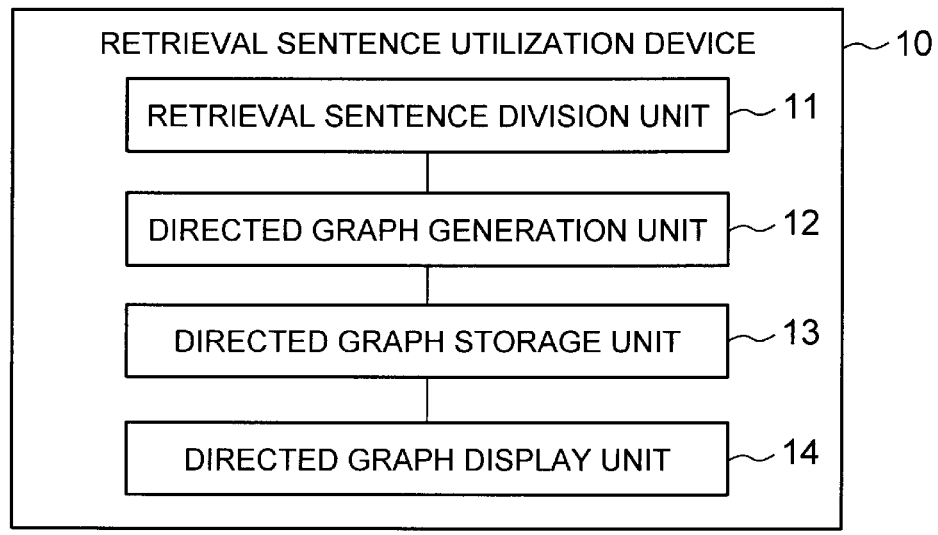
FIG. 14 is a block diagram depicting main parts of a retrieval sentence utilization device according to another aspect.

FIG. 14 is a block diagram depicting main parts of a retrieval sentence utilization device 10 according to another aspect. The retrieval sentence utilization device 10 depicted in FIG. 14 further includes: a directed graph storage unit 13 (realized by the history information holding unit 103 in the exemplary embodiments) for storing the generated directed graph; and a directed graph display unit 14 (realized by the graph input/output unit 102 and the graph processing unit 104 in the exemplary embodiments) for displaying the directed graph stored in the directed graph storage unit 13 so as to be selectable by a user.

Figure 15:
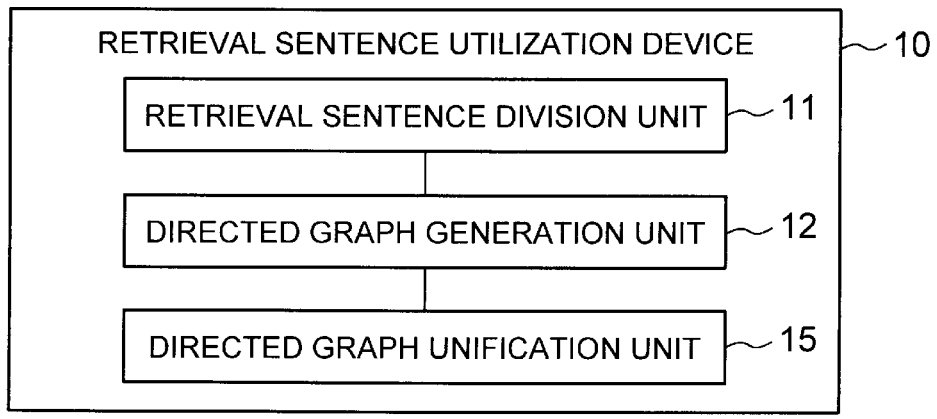
FIG. 15 is a block diagram depicting main parts of a retrieval sentence utilization device according to yet another aspect.

FIG. 15 is a block diagram depicting main parts of a retrieval sentence utilization device 10 according to yet another aspect. The retrieval sentence utilization device 10 depicted in FIG. 15 further includes a directed graph unification unit 15 for unifying a plurality of directed graphs. The directed graph unification unit 15: segments each of the plurality of directed graphs into subtrees; compares events corresponding to subtrees obtained by segmenting one of the plurality of directed graphs and events corresponding to subtrees obtained by segmenting an other one of the plurality of directed graphs; and generates a new directed graph by integrating at least subtrees having a common event.

Figure 16:
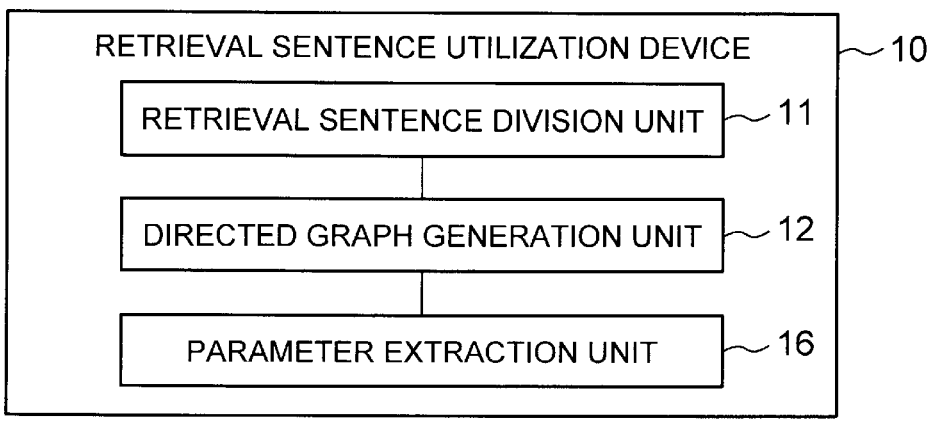
FIG. 16 is a block diagram depicting main parts of a retrieval sentence utilization device according to yet another aspect.

FIG. 16 is a block diagram depicting main parts of a retrieval sentence utilization device 10 according to yet another aspect. The retrieval sentence utilization device 10 depicted in FIG. 16 further includes a parameter extraction unit 16 (realized by the graph processing unit 104 in the exemplary embodiments) for extracting, from the directed graph, a parameter displayed on a display device together with a result of retrieval using the retrieval sentence corresponding to the directed graph, with reference to one or more parameters of the source of the event and one or more parameters of the object of the event (these parameters are stored in the parameter storage unit 105 in the exemplary embodiments).

The foregoing exemplary embodiments can be wholly or partly described as, but is not limited to, the following supplementary notes.

(Supplementary note 1) A retrieval sentence utilization device comprising: retrieval sentence division means for dividing a retrieval sentence into a plurality of retrieval contents each of which includes an event; and directed graph generation means for generating, from respective retrieval contents, subtrees each of which includes an edge as the event and includes nodes as a source of the event and an object of the event, and integrating the subtrees into a directed graph, wherein the directed graph generation means places the subtrees in the directed graph according to occurrence order of events corresponding to the subtrees.

(Supplementary note 2) The retrieval sentence utilization device according to supplementary note 1, wherein the directed graph generation means places, in the directed graph, a node corresponding to an object of an event that occurs later relative to a node corresponding to an object of an event that occurs earlier in such a way that it is possible to identify the later occurring event occurs after the earlier occurring event occurs.

(Supplementary note 3) The retrieval sentence utilization device according to supplementary note 1 or 2, further comprising retrieval sentence reconstruction means for segmenting the directed graph into the subtrees, determining the occurrence order of the events corresponding to the subtrees from placement positions of the subtrees in the directed graph, and reconstructing the retrieval contents from the subtrees with reference to the occurrence order of the events.

(Supplementary note 4) The retrieval sentence utilization device according to any of supplementary notes 1 to 3, further comprising: directed graph storage means for storing the generated directed graph; and directed graph display means for displaying the directed graph stored in the directed graph storage means, on a display device so as to be selectable by a use.

(Supplementary note 5) The retrieval sentence utilization device according to any of supplementary notes 1 to 4, further comprising directed graph unification means for unifying a plurality of directed graphs, wherein the directed graph unification means segments each of the plurality of directed graphs into subtrees; compares events corresponding to subtrees obtained by segmenting one of the plurality of directed graphs and events corresponding to subtrees obtained by segmenting an other one of the plurality of directed graphs; and generates a new directed graph by integrating at least common subtrees in corresponding event.

(Supplementary note 6) The retrieval sentence utilization device according to supplementary note 5, wherein the directed graph unification means regards the directed graphs generated by unifying at least common subtrees in corresponding event as candidates for the new directed graph, and then designates the candidate which does not include a loop as the new directed graph.

(Supplementary note 7) The retrieval sentence utilization device according to any of supplementary notes 1 to 6, further comprising a parameter extraction means for extracting, from the directed graph, a parameter displayed on a display device together with a result of retrieval using the retrieval sentence corresponding to the directed graph, with reference to one or more parameters of the source of the event and one or more parameters of the object of the event.

(Supplementary note 8) The retrieval sentence utilization device according to any of supplementary notes 1 to 7, wherein each node in the directed graph corresponds to any of a file, a process, and a communication destination, and wherein each edge in the directed graph corresponds to any of file access operation, start or end of a process, and communication operation.

(Supplementary note 9) A retrieval sentence utilization method comprising: dividing a retrieval sentence into a plurality of retrieval contents each of which includes an event; and generating, from each of the retrieval contents, a subtree in which the event is an edge and a source of the event and an object of the event are nodes, and integrating a plurality of subtrees generated from the retrieval contents to generate a directed graph, wherein, when generating the directed graph, the plurality of subtrees are placed in the directed graph according to occurrence order of events corresponding to the plurality of subtrees.

(Supplementary note 10) The retrieval sentence utilization method according to supplementary note 9, wherein, when generating the directed graph, a node corresponding to an object of an event that occurs later is placed in the directed graph relative to a node corresponding to an object of an event that occurs earlier in such a way that it is possible to identify the later occurring event occurs after the earlier occurring event occurs.

(Supplementary note 11) A retrieval sentence utilization program for causing a computer to execute: a process of dividing a retrieval sentence into a plurality of retrieval contents each of which includes an event; and a process of generating, from each of the retrieval contents, a subtree in which the event is an edge and a source of the event and an object of the event are nodes, and integrating a plurality of subtrees generated from the retrieval contents to generate a directed graph, wherein, when generating the directed graph, the computer is caused to execute a process of placing the plurality of subtrees in the directed graph according to occurrence order of events corresponding to the plurality of subtrees.

(Supplementary note 12) The retrieval sentence utilization program according to supplementary note 11, causing the computer to, when generating the directed graph, execute a process of placing, in the directed graph, a node corresponding to an object of an event that occurs later relative to a node corresponding to an object of an event that occurs earlier in such a way that it is possible to identify the later occurring event occurs after the earlier occurring event occurs.

(Supplementary note 13) A non-transitory storage medium storing a retrieval sentence utilization program, when executed by a processor, causes the processor to execute: a process of dividing a retrieval sentence into a plurality of retrieval contents each of which includes an event; and a process of generating, from each of the retrieval contents, a subtree in which the event is an edge and a source of the event and an object of the event are nodes, and integrating a plurality of subtrees generated from the retrieval contents to generate a directed graph, wherein, when generating the directed graph, the computer is caused to execute a process of placing the plurality of subtrees in the directed graph according to occurrence order of events corresponding to the plurality of subtrees.

(Supplementary note 14) The storage medium according to supplementary note 13, wherein the retrieval sentence utilization program, when executed by the processor, causes the processor to execute a process of placing, in the directed graph, a node corresponding to an object of an event that occurs later relative to a node corresponding to an object of an event that occurs earlier in such a way that it is possible to identify the later occurring event occurs after the earlier occurring event occurs.

REFERENCE SIGNS LIST 10 retrieval sentence utilization device
11 retrieval sentence division unit
12 directed graph generation unit 13 directed graph storage unit
14 directed graph display unit
15 directed graph unification unit
16 parameter extraction unit
100 retrieval sentence utilization device
101 retrieval sentence input/output unit
102 graph input/output unit
103 history information holding unit
104 graph processing unit
105 parameter storage unit
106 query processing unit
110 database (DB)
120 display device
130 input device
2000 CPU
2001 storage
2002 memory

The invention claimed is:

1. A retrieval sentence utilization device comprising:
a memory storing instructions; and
one or more processors configured to execute the instructions to:
divide a retrieval sentence into a plurality of retrieval contents each of which includes an event; and
generate, from respective retrieval contents, subtrees each of which includes an edge as the event and includes nodes as a source of the event and an object of the event, and integrate the subtrees into a directed graph,
wherein when generating the subtrees, the one or more processors place the subtrees in the directed graph according to occurrence order of events corresponding to the subtrees,
wherein the one or more processors are further configured to execute the instructions to:
unify a plurality of directed graphs;
segment each of the plurality of directed graphs into subtrees;
compare events corresponding to subtrees obtained by segmenting one of the plurality of directed graphs and events corresponding to subtrees obtained by segmenting an other one of the plurality of directed graphs; and
generate a new directed graph by integrating at least common subtrees in corresponding event.

2. The retrieval sentence utilization device according to claim 1, wherein the one or more processors place, in the directed graph, a node corresponding to an object of an event that occurs later relative to a node corresponding to an object of an event that occurs earlier in such a way that it is possible to identify the later occurring event occurs after the earlier occurring event occurs.

3. The retrieval sentence utilization device according to claim 1, wherein the one or more processors are further configured to execute the instructions to:
segment the directed graph into the subtrees, determine the occurrence order of the events corresponding to the subtrees from placement positions of the subtrees in the directed graph, and reconstruct the retrieval contents from the subtrees with reference to the occurrence order of the events.

4. The retrieval sentence utilization device according to claim 1, further comprising:
a storage for storing the generated directed graph;
wherein the one or more processors are further configured to execute the instructions to display the directed graph stored in the directed graph storage means, on a display device so as to be selectable by a user.

5. The retrieval sentence utilization device according to claim 1, wherein the one or more processors regard the directed graphs generated by unifying at least common subtrees in corresponding event as candidates for the new directed graph, and then designate the candidate which does not include a loop as the new directed graph.

6. The retrieval sentence utilization device according to claim 1,
wherein the one or more processors are further configured to execute the instructions to extract, from the directed graph, a parameter displayed on a display device together with a result of retrieval using the retrieval sentence corresponding to the directed graph, with reference to one or more parameters of the source of the event and one or more parameters of the object of the event.

7. The retrieval sentence utilization device according to claim 1, wherein each node in the directed graph corresponds to any of a file, a process, and a communication destination, and
wherein each edge in the directed graph corresponds to any of file access operation, start or end of a process, and communication operation.

8. A computer-implemented retrieval sentence utilization method comprising:
dividing a retrieval sentence into a plurality of retrieval contents each of which includes an event; and
generating, from each of the retrieval contents, a subtree in which the event is an edge and a source of the event and an object of the event are nodes, and integrating a plurality of subtrees generated from the retrieval contents to generate a directed graph,
wherein, when generating the directed graph, the plurality of subtrees are placed in the directed graph according to occurrence order of events corresponding to the plurality of subtrees,
wherein the method further comprises:
unifying a plurality of directed graphs;
segmenting each of the plurality of directed graphs into subtrees;
comparing events corresponding to subtrees obtained by segmenting one of the plurality of directed graphs and events corresponding to subtrees obtained by segmenting an other one of the plurality of directed graphs; and
generating a new directed graph by integrating at least common subtrees in corresponding event.

9. The computer-implemented retrieval sentence utilization method according to claim 8, wherein, when generating the directed graph, a node corresponding to an object of an event that occurs later is placed in the directed graph relative to a node corresponding to an object of an event that occurs earlier in such a way that it is possible to identify the later occurring event occurs after the earlier occurring event occurs.

10. A non-transitory computer readable information recording medium storing retrieval sentence utilization program for causing a computer to execute:
dividing a retrieval sentence into a plurality of retrieval contents each of which includes an event; and
generating, from each of the retrieval contents, a subtree in which the event is an edge and a source of the event and an object of the event are nodes, and integrating a plurality of subtrees generated from the retrieval contents to generate a directed graph,
wherein, when generating the directed graph, the computer is caused to execute placing the plurality of subtrees in the directed graph according to occurrence order of events corresponding to the plurality of subtrees, wherein the computer executes:

unifying a plurality of directed graphs;

segmenting each of the plurality of directed graphs into subtrees;

comparing events corresponding to subtrees obtained by segmenting one of the plurality of directed graphs and events corresponding to subtrees obtained by segmenting an other one of the plurality of directed graphs; and generating a new directed graph by integrating at least common subtrees in corresponding event.

11. The computer readable information recording medium according to claim 9, wherein the program causes the computer to, when generating the directed graph, execute placing, in the directed graph, a node corresponding to an object of an event that occurs later relative to a node corresponding to an object of an event that occurs earlier in such a way that it is possible to identify the later occurring event occurs after the earlier occurring event occurs.

12. The retrieval sentence utilization device according to claim 2, wherein the one or more processors are further configured to execute the instructions to:

segment the directed graph into the subtrees, determine the occurrence order of the events corresponding to the subtrees from placement positions of the subtrees in the directed graph, and reconstruct the retrieval contents from the subtrees with reference to the occurrence order of the events.

13. The retrieval sentence utilization device according to claim 2, further comprising:

a storage for storing the generated directed graph;

wherein the one or more processors are further configured to execute the instructions to display the directed graph stored in the directed graph storage means, on a display device so as to be selectable by a user.

14. The retrieval sentence utilization device according to claim 3, further comprising:

a storage for storing the generated directed graph;

wherein the one or more processors are further configured to execute the instructions to display the directed graph stored in the directed graph storage means, on a display device so as to be selectable by a user.

\* \* \* \* \*